Patented July 6, 1948

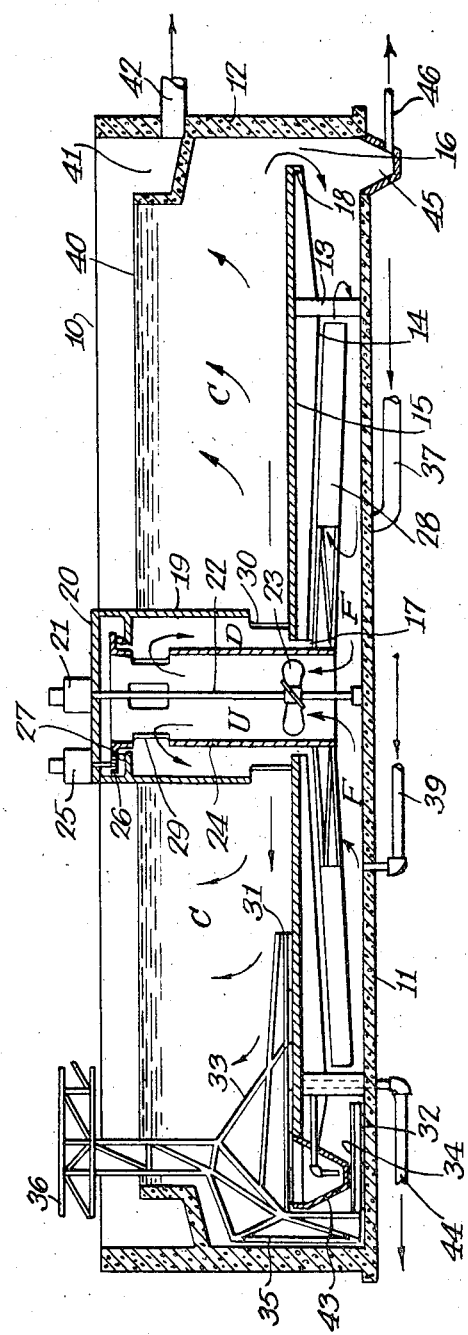

2,444,671

UNITED STATES PATENT OFFICE 2,444,671

LIQUID TREATMENT TANK WITH SLUDGE REMOVAL MEANS THEREFOR

Frank D. Prager, Chicago, Ill., assignor to Graver Tank & Mfg. Co. Inc., a corporation of Delaware Application November 4, 1944, Serial No. 561,997

7 Claims. (Cl. 210—16)

This invention relates to liquid treatment, and particularly to the removal of settled sludge in large, shallow tanks for the flocculation and clarification of water.

It is a primary object of this invention to provide equipment for such purposes with a minimum of cost and a maximum of efficiency.

Another object is that the tank should combine flocculation and clarification zones in one enclosure, so as to make the apparatus smaller, simpler, cheaper and better.

Another object is to provide such a tank having a great capacity while being limited as to the depth, thereby involving a shallow tank design and flat partitions between the flocculation and clarification zones.

Another object is to provide for the necessary removal of sludge from over such a substantially flat partition, as well as from below such a partition.

Another object is to provide economical and efficient means for flocculation, whereby a large but shallow flocculation chamber is utilized to the highest possible extent by means of a minimum number of movable flocculating members.

Another object is to provide the greatest possible uniformity of conditions in such flocculation chambers.

Still other objects may appear from the detailed description which follows.

In the drawing, the sole figure is a central vertical section through one embodiment of this invention.

The treatment tank 10 is generally about 8 to 20 feet deep from the open top to the flat bottom 11, and confined by a substantially cylindrical wall 12, having a diameter of about 50 to 150 feet. These dimensions are stated to indicate the approximate range of tank dimensions contemplated herein. While the present invention could be applied in tanks of different dimensions it finds the greatest utility within the limits as indicated. Tanks of such dimensions are known as shallow tanks.

Furthermore, the tank dimensions affect the design of the structural parts and of the equipment used in the tank; particularly, the design of required flocculating and sludge removing equipment.

Ordinarily the required diameter of such a tank is a function of the quantity and quality of the water. For instance, if treated water is expected at the rate of ten million gallons per day, and if the chemical and physical conditions of the treatment justify a flow rate of about two gallons per square foot per minute, it appears at once that the clarification zone must have an area of about 3,500 square feet or about 67 feet diameter. Furthermore the necessary depth depends on similar factors. For instance, in the example mentioned, I may use a tank holding about 480,000 gallons or 64,000 cubic feet; in that event an area of 3,500 square feet as mentioned results in a depth of about 18 feet. The total detention time is ordinarily divided between a shorter period of gentle but positive flocculation, and a longer period of slower flows for clarification with sludge filtration. Thus I may, for instance, sub-divide such a cylindrical tank into two superimposed zones of $4\frac{1}{2}$ and $13\frac{1}{2}$ feet depth respectively. The two zones are separated by a flat partition or false bottom, in order to prevent disturbance of the clarification and sludge filtration zone.

Such a false bottom of almost 67 feet diameter requires an adequate system of supporting members. I provide these by means of a ring of posts 13 resting on the main bottom 11, concentrically with the tank, between the center and periphery thereof. Substantially horizontal, radial beams 14 are supported by the posts. The beams in turn support a round false bottom 15, separating the underlying flocculation zone F from the overlying clarification zone C.

This false bottom has a somewhat smaller diameter than the tank, providing an annular opening 16 between the tank wall 12 and the outer edge of the false bottom. The false bottom has a round central hole 17 so that in effect it forms an annular table or tray. A cylindrical skirt or flange 18 may depend from the outer edge of the false bottom, mainly for the purpose of interconnecting, spacing and holding the outer ends of the beams 14. Incidentally, a hood 15, 18, is formed by this flange together with the false bottom.

A cylindrical partition 19 of relatively small diameter extends upwardly from the false bottom to the top of the tank concentrically around the hole 17 but having somewhat greater diameter than said hole. The members comprising the posts 13, beams 14, tray 15, flange 18, and partition 19 may be considered as a hollow pier. The whole hood and pier structure 13, 14, 15, 18 and 19 is stationary and concentric with the tank. The ring of posts 13 preferably forms a circle having about one half the area of the hood 15, 18 or sometimes slightly more.

The pier supports a platform 20 at the top of the tank. On the platform I provide a motor reducer 21 to drive a vertical shaft 22. This shaft extends concentrically through the hole 17 and carries a propeller 23 which serves as a rapid mixer and circulator for preformed, suspended sludge, newly received liquid, and chemical reagents. The propeller rotates within a vertical drum or draft tube 24, extending from a position in the upper part of the flocculation zone F, between the bottom 11 and hood 15, 18, through the hole 17, toward the top of the tank. The propeller is arranged upon rotation to maintain an updraft in the tube or drum 24.

This drum is rotatably supported from the pier 13, 14, 15, 18, 19, at the top of the tank, and a motor reducer 25 is provided on the platform 20 to rotate the drum, through a pinion 26 and gear 27, about the vertical axis of the drum, coinciding with the vertical center line of the tank, at a velocity which is slower than that of the shaft 22, in revolutions per minute. Flocculator-impeller blades 28 are secured to the outside of the drum, in the zone F, below but preferably adjacent the false bottom 15 and beams 14, spaced from the bottom 11, and substantially covering the diameter of the zone within the ring of posts 13 but just avoiding contact with these posts. Both the beams 14, adjacent the flocculator, and the flocculator blades themselves may measure about one to two feet in depth.

Below and adjacent the top of the tank, the drum 24 is apertured by openings 29. Thus the body of the drum extends upwardly to adjacent but below the top of the tank. Similarly, the cylindrical partition 19 is apertured, and its body extends downwardly to above but adjacent the false bottom 15, where openings 30 are made in said partition. Thus the updraft maintained in the upflow zone U within the drum 24, by the rapid mixer 23, results in a vertical circulation outwardly through the openings 29, downwardly through the downflow zone D between the drum 24 and the partition 19, outwardly through the openings 30 and over the false bottom 15 of the clarification zone C, downwardly through the annular opening 16, and inwardly back through the flocculation zone F below the hood 15, 18.

The velocity of this vertical circulation, in the zones U and D, is desirably controlled to provide adequate mixture of the raw water, chemicals, and sludge, but to avoid undue breakup of floc. For this reason it is generally kept in the middle or upper ranges of the usual mixing velocities of 1 to 3 feet per second. The tip speed of the rapid mixer 23, of course, is generally greater than the water velocity stated; it may amount to about 5 feet per second, or more.

Furthermore, it will be understood that with such velocities in the said vertical zones U and D, considerably slower velocities prevail throughout the greater part of the vertical circulation in the shallow zones C and F. Of course, it would be possible to provide local restrictions and thereby to enforce relatively rapid velocities, for instance, by restricting the opening 16, or by providing additional partitions to maintain a succession of similar openings in the zone C; but this would result in greatly increased hydraulic loads which must be overcome by the circulator and motor 23, 21; and this in turn would result in increased costs, as well as lowered efficiency due to higher breakup of floc and other disadvantages. For this reason such an expedient is not practical, and the fact must be taken into account that the vertical circulation tends to be slow, except within the vertically extending zones U, D.

The actual velocity of the vertical circulation in the zones C, F is not readily determined and even less easily controlled, but will generally approach a function of the geometrical area through which such circulation passes. For instance, as the vertical circulation enters the flocculation zone, it passes, adjacent the periphery of the zone, through a cylindrical area of about 60 feet diameter and 4½ feet height, in a tank as mentioned. The geometrical area for this flow, accordingly, would be about 850 square feet. The actual flow area mentioned will amount to at least a few hundred square feet, at said location. The flow area for the vertical circulation, in the outer part of the clarification zone, is appreciably larger.

These areas, ordinarily, are many times larger than the area of the zones U or D. It was assumed that the tank will treat ten million gallons per day, and on the basis of experience it may then be assumed furthermore that the vertical circulation should amount to a flow somewhere between ten and fifty million gallons per day, depending on the nature of the liquid to be treated, the results expected, and other factors known to the art. Assuming a combined throughput flow and circulation, through the zones U and D, amounting to thirty million gallons per day, at 2 feet per second, the tube 24 and zone U has to have an area of 23.3 square feet and a diameter of 5½ feet. On the other hand, as stated above, the flow areas at the periphery of the tank, which are present due to the more basic requirements, amount to at least several hundred square feet, and thus involve flow velocities in said flow of 30 million gallons per day, down to a very few inches or fractional inches per second. These slow velocities of the vertical circulation, prevailing within large outer areas of the tank, are certain to result in the sedimentation of settleable materials from the vertically circulating flows, as such materials are naturally present and intentionally built up within such flows.

Therefore, I provide sludge scrapers 31 operating over at least the outer portions of the false bottom 15 below the clarification zone C, and also sludge scrapers 32 operating over the outer portion of the bottom 11 in the flocculation zone F, surrounding the posts 13. These sludge scrapers are carried respectively by truss members 33 and 34, extending substantially horizontally from, and carried by, a common structural member 35, which upwardly extends through the annular opening 16, and which reaches from the top of the tank to adjacent the bottom 11. This structural means 35 may also have rigid connection with a further, substantially horizontal truss 36 at the top of the tank, which carries means well known to the art and not shown herein to pivot the whole assembly 36, 35, 33, 34 about the center of the tank, and to slowly rotate this assembly for quiescent sludge removal.

Raw liquid to be treated in the tank enters the flocculation zone F through the pipe 37 which discharges through the bottom 11. Any required chemical reagents are similarly discharged into the tank through a pipe 39. Treated liquid is withdrawn from the top of the clarification zone C over a weir 40 into a launder 41 emptied by an outlet pipe 42. Suitable controls of course may be interposed on the piping 37, 39, and 42, in manner well known to the art, which need not be shown herein.

The manner of withdrawing separated sludge from the tank depends upon local conditions inasmuch as various different methods of operation may be realized in this respect, in manner known to the art. In the present embodiment, all sludge can be removed from the false bottom 15, through a sump 43 recessed into and depending from said false bottom. This sump may be drained by a pipe 44 extending to the outside of the tank, for instance, through one of the posts 13.

In operation the raw liquid from pipe 37 and chemicals from pipe 39 are mixed with circulating sludge impelled by the members 23 and 28 and the mixture is then drawn into and through the updraft zone U and downdraft zone D at the aforementioned velocity of about 2 ft. per second, or more; this treatment being applied for a short period, based on the assumed rate of flow through the pipe 37, and dimensions of zones U and D. As a result of this initial, rapid mixing treatment the chemicals and sludge are thoroughly dispersed in and intimately contacted with the raw water, and the formation of flocculatable sludge precipitates starts.

Subsequently the mixture flows outwardly over the false bottom 15, through the lower part of the clarification zone C, at decreasing velocities as mentioned, and then inwardly into and through the hood 15, 18. The velocity of the flow under the hood increases inwardly as the vertical circulation approaches the center of the tank. Moreover, a substantially horizontal rotation is superimposed over the vertical circulation, under the hood, by the flocculator blades 28. The velocity of the latter is inherently greater adjacent the outer end than in the center of the tank, thereby at least partly compensating the differences of velocity of the vertical circulation, and resulting in a more nearly uniform, flocculating velocity under the hood. The ideal flocculating velocity is generally within the lower range of the usual mixing velocities of 1 to 3 feet per second; and in order to obtain such a velocity of the water the flocculating blade 28 has to travel at a somewhat higher tip velocity, such as 4 feet per second. Assuming that the flocculator 28 covers a circle of 30 feet diameter, this device should, accordingly, rotate at a speed of about 2½ R. P. M.

The propeller 23 generally must rotate at much greater speed to enforce the aforementioned vertical circulation. This is the reason for the feature that two independently movable structures 23 and 28 are provided herein. However, in some instances higher flocculating velocities or lower rapid-mixing velocities may be permissible and in such event this arrangement can be simplified, in obvious manner, known to the art.

The horizontal flows set up by the flocculator 28 are inherently centrifugal, at least adjacent the tips of the flocculator blades. Since the flocculator, as mentioned, is spaced above the bottom 11, there will be inward return flows over said bottom. Since the flow velocities, as mentioned, are higher in the zone F than in the zone C it follows that settling tends to take place more copiously, and further inward, in the latter zone. It is for this reason that the upper scrapers 31 are shown reaching farther inward than the lower ones, at 32.

The vertical circulation, as previously explained, may pass through the zones U, D, C and F a number of times. In that event the water is exposed to the rapid mixing and flocculating treatment a number of times. Likewise the water is repeatedly exposed to the more quiescent but longer lasting sludge filtration treatment in the bottom part of the clarification zone.

As amounts of water enter the tank at 37, corresponding amounts are displaced from the vertical circulation passing over the false bottom 15, which water thereupon passes toward the overflow weir 40 at an extremely slow rate, the maximum being about 2 gallons per square foot per minute, or 3.2 inches per minute, under the assumptions made. Of course it will be understood that this rising rate or throughput rate still is relatively rapid, as compared with the throughput rates allowable in other types of large, shallow liquid treatment tanks, intended to produce comparable results.

The rising rate of the water throughout the clarification zone, and the vertical circulation rate in the outer part of the clarification zone, allow the sedimentation of sludge on the false bottom 15. Sludge may also settle on the outer part of the bottom 11, inasmuch as even the combined vertical and horizontal circulations prevailing under the hood cannot always prevent the sedimentation of all of the sludge, particularly at substantial distances from the tip of the flocculator blade 28. The sludge settling on the outer area of the bottom 11 is scraped inwardly, whereby it is returned to the zone adjacent the impeller 28, where this sludge is entrained by the flows set up by the flocculator, and inwardly displaced, to be finally engaged by the suction of the propeller 23, to enter or reenter the vertical circulation. The scrapers operating over the false bottom 15 may simply shift the sludge around said false bottom in substantially circular and slightly outwardly directed lines, until the sludge is collected in the sump 43. Thus all of the sludge is ultimately disposed of by removal from this sump through the pipe 44.

In a modified operation, no sludge is withdrawn from the sump 43, so that all the sludge settling on the false bottom 15 reaches the edge of said false bottom, where it drops through the opening 16 into the underlying flocculation zone, this gravitational movement being supported by the vertical circulation of the water and not appreciably opposed by the centrifugal flows of the horizontal rotation prevailing under the hood. In this event it will be desirable to provide a sump 45 recessed into and extending below the bottom 11, and to have the scraper 32 shift the sludge into said sump, to be finally disposed of by a sludge outlet pipe 46 connected to this sump in well known manner. Thus it will be seen that the sludge sump and outlet means can be located either in the path of rotation of the upper scraper 31, or in the path of rotation of the lower scraper 32, and all of the sludge can be disposed of in either event. Of course, both sumps 43 and 45 can be used, instead of using only one.

Various further modifications may be applied.

I claim:

1. A liquid treatment tank comprising a substantially flat, circular bottom; a wall upstanding from a peripheral part of said bottom, the diameter of said wall being considerably greater than the height thereof; a single, substantially flat partition horizontally installed between said bottom and the top of the tank to separate a lower flocculation chamber from an upper clarification chamber, said partition being completely spaced from said wall and being centrally apertured to allow communication between said chambers through a large, annular, peripheral opening which is continuous and unobstructed, and a smaller, central opening; a ring of upright posts resting on said bottom and supporting said partition, the diameter of said ring being considerably smaller than that of said bottom and wall; liquid impeller means to maintain a closed liquid circulation through said chambers and openings; a sludge scraper assembly comprising a structural member downwardly extending through said peripheral opening, sludge scraper means carried by said structural member in said clarification chamber above and adjacent said partition, additional sludge scraper means carried by said structural member in said flocculation chamber above and adjacent said bottom outside said ring of posts, and means to slowly rotate said sludge scraper assembly about the vertical centerline of the tank, whereby said structural member will travel along said unobstructed peripheral opening; inlet means to discharge liquid to be treated and any required reagents into said liquid circulation; liquid outlet means at the top of said clarification chamber; and sludge outlet means in the path of at least one of said sludge scraper means.

2. A liquid treatment tank as described in claim 1, additionally including separate liquid impeller means below said partition and inside said ring of posts to maintain a liquid rotation about said vertical centerline, in said flocculation chamber.

3. A liquid treatment tank as described in claim 1, wherein said partition is installed in the lower part of the tank so that said clarification chamber has greater depth and volume than said flocculation chamber.

4. A liquid treatment tank comprising a substantially flat, circular bottom; a wall upstanding from a peripheral part of said bottom, the diameter of said wall being considerably greater than the height thereof; a single, substantially flat partition horizontally installed between said bottom and the top of the tank to separate a lower flocculation chamber from an upper clarification chamber, said partition being completely spaced from said wall and being centrally apertured to leave a large, annular, peripheral opening which is continuous and unobstructed, and a smaller, central opening; a ring of upright posts rest on said bottom and supporting said partition, the diameter of said ring being smaller than that of said bottom and wall; liquid impeller means rotatable about an axis coinciding with the vertical center line of the tank to maintain a closed liquid circulation through said chambers and openings; power means mounted at the top of the tank to rotate said impeller means; a sludge scraper assembly comprising a structural member downwardly extending through said peripheral opening, sludge scraper means carried by said structural member above and adjacent said partition, additional sludge scraper means carried by said structural member above and adjacent said bottom outside said ring of posts, and means to slowly rotate said sludge scraper assembly about said vertical centerline; inlet means to discharge liquid to be treated and any required reagents into said liquid circulation; liquid outlet means at the top of said clarification chamber; and sludge outlet means in the path of at least one of said sludge scraper means.

5. A liquid treatment tank comprising a substantially flat, circular bottom; a wall upstanding from a peripheral part of said bottom; a single, substantially flat partition horizontally installed between said bottom and the top of the tank to separate a lower flocculation chamber from an upper clarification chamber, said partition being completely spaced from said wall and being centrally apertured to leave a large, annular, peripheral opening which is continuous and unobstructed, and a smaller, central opening; a ring of upright posts resting on said bottom and supporting said partition, the diameter of said ring being smaller than that of said bottom and wall; a first liquid impeller adjacent said central opening, rotatable about an axis coinciding with the vertical center line of the tank to maintain a closed liquid circulation upwardly through said central opening, outwardly through said clarification chamber, downwardly through said peripheral opening and inwardly through said flocculation chamber; a second liquid impeller below said partition and inside said ring of posts, rotatable about said axis to maintain a liquid rotation in said flocculation chamber; power means mounted at the top of the tank to rotate said liquid impellers; a sludge scraper assembly comprising a structural member downwardly extending through said peripheral opening, sludge scraper means carried by said structural member above and adjacent said partition, additional sludge scraper means carried by said structural member above and adjacent said bottom outside said ring of posts, and means to slowly rotate said sludge scraper assembly about said vertical centerline; inlet means to discharge liquid to be treated and any required reagents into said liquid circulation; liquid outlet means at the top of said clarification chamber; and sludge outlet means in the path of at least one of said sludge scraper means.

6. A liquid treatment tank as described in claim 5, additionally including a pair of annular partitions concentric with the tank; the body of the inner partition extending upwardly from said flat partition adjacent the edge of said central opening, to a position below the top of the tank, and the body of the outer partition extending downwardly from the top of the tank to above said flat partition, whereby said liquid circulation passes upwardly through said inner partition, downwardly through said outer partition, and further on as stated in claim 5.

7. A liquid treatment tank as described in claim 5, additionally including a pair of annular, cylindrical partitions concentric with the tank, the body of the outer partition being rigidly supported by said flat partition and extending from above the same upward to the top of the tank, the body of the inner partition being rotatably suspended from the top of said outer partition and extending downward from below the top of the tank to adjacent the edge of said central opening, said central opening being circular, and said inner partition having paddle means outwardly extending therefrom below said flat partition, whereby the inner partition forms part of said second liquid impeller.

FRANK D. PRAGER.

REFERENCES CITED

The following references are of record in the file of this patent:

UNITED STATES PATENTS

| Number | Name | Date |
| --- | --- | --- |
| 1,754,870 | Wickes | Apr. 15, 1930 |
| 2,336,659 | Welp | Dec. 14, 1943 |
| 2,353,358 | Prager | July 11, 1944 |